United States Patent [19]

Iwamoto

[11] Patent Number: 5,465,630
[45] Date of Patent: Nov. 14, 1995

[54] DRIVE TRANSMITTING APPARATUS FOR A WORKING VEHICLE

[75] Inventor: Masatoshi Iwamoto, Sakai, Japan

[73] Assignee: Kubota Corporation, Japan

[21] Appl. No.: 273,768

[22] Filed: Jul. 12, 1994

[30] Foreign Application Priority Data

Sep. 14, 1993 [JP] Japan ..................... 5-229080
Sep. 14, 1993 [JP] Japan ..................... 5-229081

[51] Int. Cl.⁶ .................................................. F16H 3/08
[52] U.S. Cl. ....................................................... 74/331
[58] Field of Search ........................................... 74/331

[56] References Cited

U.S. PATENT DOCUMENTS

| | | | |
|---|---|---|---|
| 4,580,459 | 4/1986 | Zenker et al. | 74/359 |
| 4,594,908 | 6/1986 | Akashi et al. | 74/331 |
| 4,754,665 | 7/1988 | VaNdervoort | 74/331 |
| 4,964,313 | 10/1990 | Davis | 74/331 |
| 5,161,423 | 11/1992 | Ore | 74/339 |
| 5,178,039 | 1/1993 | Shirley et al. | 74/606 R |
| 5,259,260 | 11/1993 | Schneider | 74/331 |
| 5,272,929 | 12/1993 | Fletcher et al. | 74/331 |
| 5,385,066 | 1/1995 | Braun | 74/331 |
| 5,394,763 | 3/1995 | Braun | 74/331 |

*Primary Examiner*—Dirk Wright
*Attorney, Agent, or Firm*—Webb Ziesenheim Bruening Logsdon Orkin & Hanson

[57] ABSTRACT

An apparatus for transmitting drive from an engine through a main clutch to front or rear wheels of a working vehicle, includes a main change speed device and an auxiliary change speed device. The main change speed device includes a first shaft, an intermediate shaft, and a main shaft disposed in an end-to-end relationship with the first shaft and extending parallel to the intermediate shaft. The auxiliary change speed device includes an output shaft axially overlapping and extending parallel to the main shaft, and a creep shaft extending parallel to the output shaft. The intermediate shaft supports a first shift clutch for selectively providing a first and a second speed stages. The main shaft supports a second shift clutch for selectively providing a third and a fourth speed stages. The output shaft supports a third shift clutch for selectively providing a high speed state and an ultralow speed state, and a fourth shift clutch for selectively providing a low speed state and a backward drive state.

4 Claims, 2 Drawing Sheets

DRIVE TRANSMITTING APPARATUS FOR A WORKING VEHICLE

BACKGROUND OF THE INVENTION

1. Field of the Invention

The present invention relates to a drive transmitting apparatus for a working vehicle.

2. Description of the Related Art

A conventional working vehicle includes a drive transmitting apparatus having a first and a second transmission cases rigidly connected to an engine to form an integrated vehicle body. The first transmission case contains a main change speed device, while the second transmission case contains an auxiliary change speed device and a rear differential.

The above common type of transmitting apparatus has a disadvantage that, since the first and second transmission cases are connected in the axial direction, the entire transmission has an undesirably long axial dimension. U.S. Pat. No. 4,580,459 discloses an apparatus including a first transmission shaft having a gear group for use in main change speed, and a second transmission shaft for use in auxiliary change speed, both transmission shafts extending parallel to each other axially of the vehicle, whereby the entire transmission has a reduced axial dimension.

SUMMARY OF THE INVENTION

The object of the present invention is to realize a reduced axial dimension of a transmission by employing an arrangement of transmission shafts as disclosed in the above prior patent, and to simplify the prior structure to provide a transmission apparatus which is small but outputs a large number of speeds.

The above object is fulfilled, according to the present invention, by an apparatus for transmitting drive from an engine through a clutch to front or rear wheels of a working vehicle, comprising a main change speed device and an auxiliary change speed device. The main change speed device includes a first shaft connected at one end thereof to the clutch, and having a gear mounted at the other end in an interlocked state; an intermediate shaft having, mounted thereon, an intermediate shaft gear group formed of a plurality of gears, and a first sleeve clutch; and a main shaft disposed coaxially with the first shaft and having, mounted thereon, a main shaft gear group formed of a plurality of gears, and a second sleeve clutch. The auxiliary change speed device includes an output shaft having, mounted thereon, an output shaft gear group formed of a plurality of gears, a third sleeve clutch and a fourth sleeve clutch; and a creep shaft disposed parallel to the output shaft and having, mounted thereon, a creep gear group formed of a plurality of gears. The first sleeve clutch is switchable among a first speed position corresponding to a first speed stage of the main change speed device, a second speed position corresponding to a second speed stage of the main change speed device, and a neutral position. The second sleeve clutch is switchable among a third speed position corresponding to a third speed stage of the main change speed device, a neutral position, and a fourth speed position corresponding to a fourth speed stage of the main change speed device. The third sleeve clutch is switchable among a high speed position corresponding to a high speed state of the auxiliary change speed device, an ultralow speed position corresponding to an ultralow speed state of the auxiliary change speed device, and a neutral position. The creep gear group transmits drive from the main shaft to the output shaft when the third sleeve clutch is operated to the ultralow speed position. The fourth sleeve clutch is switchable among a low speed position corresponding to a low speed state of the auxiliary change speed device, a neutral position, and a backward drive position corresponding to a backward drive state of the auxiliary change speed device.

The above construction realizes a small and inexpensive transmission simpler than the known transmission, with a reduced axial dimension, and yet providing a large number of speeds.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

An embodiment of the present invention will be described hereinafter with reference to the drawings.

Figure 1:
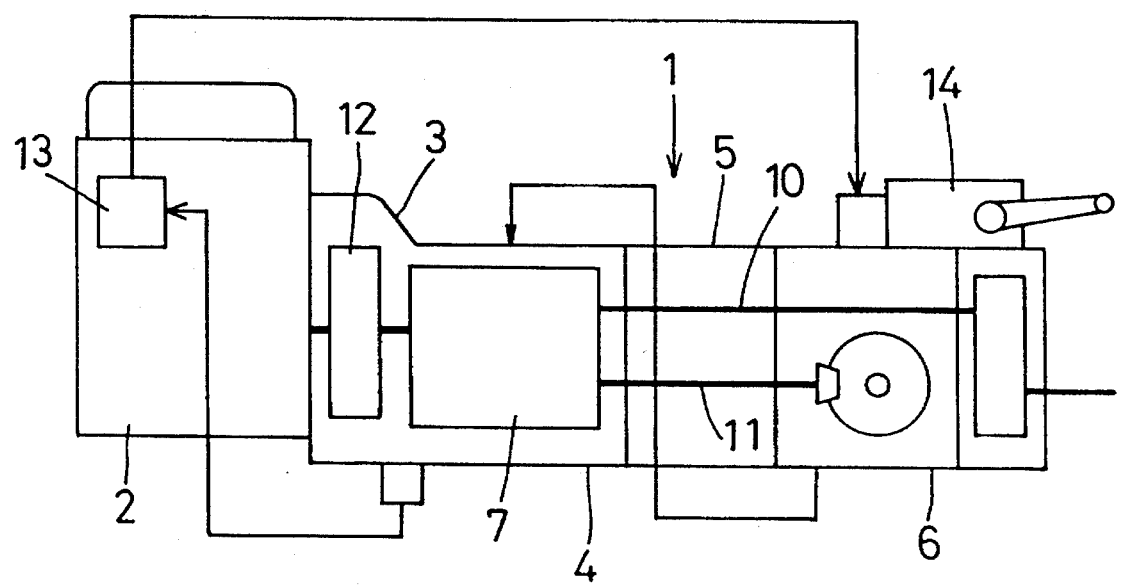
FIG. 1 is a schematic overall view of a power transmitting apparatus for a vehicle embodying the present invention.
Figure 2:
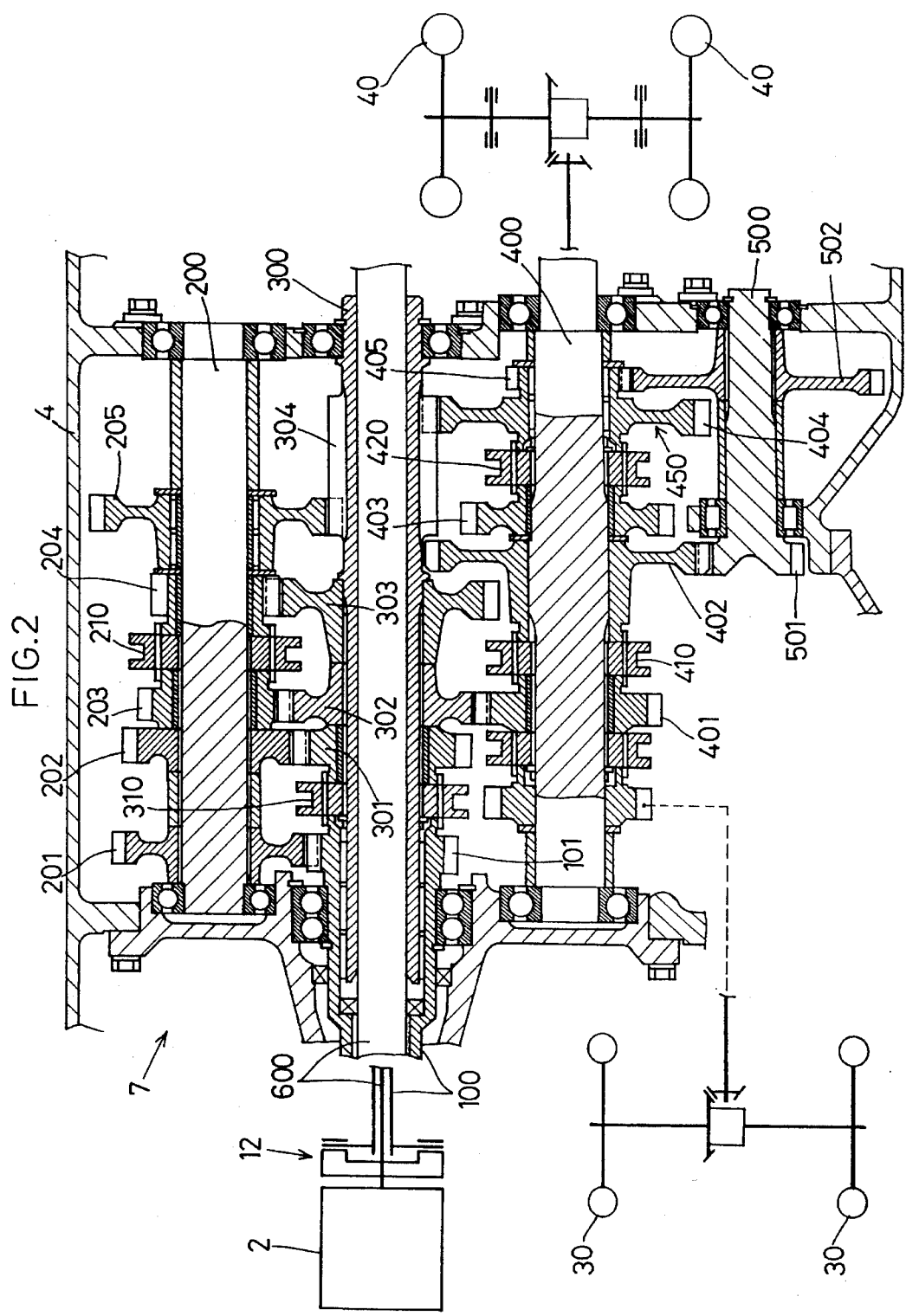
FIG. 2 is a sectional view of the power transmitting apparatus.

In FIGS. 1 and 2, a working vehicle has a vehicle body 1 formed of an engine 2, a clutch housing 3, a first transmission case 4, an intermediate case 5 and a second transmission case 6 rigidly interconnected and arranged in the stated order. Numerals 30 and 40 denote front wheels and rear wheels, respectively.

The first transmission case 4 contains a propelling line transmission 7 including a main change speed device, an auxiliary change speed device and a creep change speed device arranged close to one another. The intermediate case 5 is a hollow component. The second transmission case 6 contains a rear differential and the like.

The first transmission case 4 and intermediate case 5, and the second transmission case 6 and intermediate case 5 are interconnected through packings or the like to form oil leakproof structures, respectively. A PTO transmission shaft 10 and a propelling drive transmission shaft 11 extend through the intermediate case 5. The first and second transmission cases 4 and 6 contain lubricating oil.

Drive of the engine 2 is transmitted to the transmission 7 through a main clutch 12. A pump 13 driven by the engine 2 supplies the oil in the first and second transmission cases 4 and 6 as pressure oil to a hydraulic device 14. This oil loop is a closed loop.

The propelling line transmission 7 in the preferred embodiment of the invention will be described hereinafter.

The main clutch 12 is disposed downstream of the engine 2. A first shaft 100 is disposed downstream of the main clutch 12. A main shaft 300 extends coaxially from a downstream end of the first shaft 100. An intermediate shaft 200 and an output shaft 400 extend parallel to the main shaft 300.

Though not shown, a basic arrangement of the main shaft 300, intermediate shaft 200 and output shaft 400 is such that the axes of the three shafts form the vertices of a triangle when viewed in cross-section. Such a geometric arrangement is determined according to dimensional characteristics of each individual vehicle. In the transmission including five shafts as principal components thereof, the first shaft 100, main shaft 300 and intermediate shaft 200 and gear groups mounted on these shafts constitute the main change speed device, while the output shaft 400 and a creep shaft 500 extending parallel thereto, and gear groups mounted on these shafts constitute the auxiliary change speed device. The main change speed device provides four, i.e. a first to a fourth, speed stages, while the auxiliary change speed device is switchable among a high speed, a low speed, a creep speed and a backward drive states. The four speed stages of the main change speed device are applicable to each of the four drive states of the auxiliary change speed device. Thus, the four speed stages are provided in each of the high speed state, low speed state, creep state and backward drive state. The preferred embodiment of the invention, therefore, provides 12 forward speeds and four backward speeds, i.e. a total of 16 speeds.

Next, the five transmission shafts, i.e. the first shaft 100, intermediate shaft 200, main shaft 300, output shaft 400 and creep shaft 500, and transmission gears associated therewith will be described in order.

The first shaft 100 is a hollow shaft surrounding an auxiliary rotary shaft 600 extending from the main clutch 12. The first shaft 100 and auxiliary rotary shaft 600 are rotatable relative to each other.

The first shaft 100 has one end thereof connectable to and disconnectable from the main clutch 12, and transmits or does not transmit an engine torque with operation of the main clutch 12. The first shaft 100 has a gear 101 formed integral with the other end thereof and constantly meshed with a gear 201 of the intermediate shaft 200 described hereunder.

The intermediate shaft 200 has five gears 201–205 constituting an intermediate shaft gear group. The gears 201 and 202 are interlocked to the intermediate shaft 200. The gear 201 is meshed with the gear 101 for constantly transmitting drive from the first shaft 100 to the intermediate shaft 200. The gears 203 and 204 are mounted on the intermediate shaft 200 to be rotatable relative thereto. A first sleeve clutch 210 is mounted on the intermediate shaft 200 to be axially slidable between the gears 203 and 204. The gear 205 is mounted on the intermediate shaft 200 to be constantly rotatable relative thereto. This gear 205 forms a reversing gear group with a gear 403 mounted on the output shaft 400. A reversing mechanism based on these gears will be described later.

The main shaft 300 relatively rotatably surrounds the auxiliary rotary shaft 600 extending from the main clutch 12. A gear group mounted on the main shaft 300 will be described next. As seen from FIG. 2, the main shaft 300 has four gears constituting a main shaft gear group. Gears 302, 303 and 304 are mounted on the main shaft 300 to be constantly rotatable therewith. Gear 301 is rotatable relative to the main shaft 300, and becomes rotatable with the main shaft 300 by an axial sliding movement of a second sleeve clutch 310 mounted to the left of the gear 301 in FIG. 2. The gears 301,302, 303 and 304 on the main shaft 300 are in constant mesh with the gears 202, 203, 204 and 205 on the intermediate shaft 200, respectively.

A gear group mounted on the output shaft 400 will be described next. As seen from FIG. 2, the output shaft 400 has five gears 401,402, 403,404 and 405 arranged thereon from left to right in the drawing, which constitute an output shaft gear group. The gear 401 is rotatable with the output shaft 400 and in constant mesh with the gear 302 on the main shaft 300. The small gear 405 and large gear 404 are formed integral with each other to act as a double gear 450 freely rotatable on the output shaft 400. A third sleeve clutch 410 is mounted between the gears 401 and 402 to be axially slidable on the output shaft 400 to place one of the gears 401 and 402 in a position rotatable with the output shaft 400. The gears 403 and 404 are mounted to be rotatable relative to the output shaft 400, and selectively become rotatable with the output shaft 400 by an axial sliding movement of a fourth sleeve clutch 420 mounted between the gears 403 and 404. The gears 401,402 and 403 on the output shaft 400 are in constant mesh with the gear 302 on the main shaft 300, the gear 205 on the intermediate shaft 200, and the gear 304 on the main shaft 300, respectively.

A gear group mounted on the creep shaft 500 will be described next. The creep shaft 500 has a small gear 501 and a large gear 502 constantly rotatable with the creep shaft 500, and forming a creep gear group. The gears 501 and 502 are in constant mesh with the gears 402 and 405 on the output shaft 400, respectively.

With the above gear groups of the main change speed device and auxiliary change speed device, the main change speed device provides the first speed stage when the first sleeve clutch 210 is operated to interlock the gear 204 to the intermediate shaft 200. In this state, drive is transmitted from the first shaft 100 to the output shaft 400 through a drive path including the gear 101 on the first shaft 100, the gears 201 and 204 on the intermediate shaft 200, the gear 303 on the main shaft 300, and one of the gears on the output shaft 400.

The second speed stage is provided when the first sleeve clutch 210 is operated to interlock the gear 203 to the output shaft 400. In this state, drive is transmitted from the first shaft 100 to the output shaft 400 through the gears 101, 201 and 203, the gear 302 on the main shaft 300, and one of the gears on the output shaft 400.

Next, the second sleeve clutch 310 is operable to provide the third and fourth speed stages. That is, the forth speed stage is provided when the second sleeve clutch 310 directly connects the first shaft 100 to the main shaft 300, and the third speed stage when the second sleeve clutch 310 interlocks the gear 301 to the main shaft 300. In the fourth speed stage, the first shaft 100 and main shaft 300 are rotatable together. In the third speed stage, drive is transmitted from the first shaft 100 to the main shaft 300 through the gears 101, 201,202 and 301 and one of the gears on the output shaft 400.

Thus, drive may be transmitted from the intermediate shaft 200 to the main shaft 300 basically through four different transmission paths. Further, the auxiliary change speed device provides the four different speed states, i.e. high speed, low speed, creep (very low speed) and backward drive. These transmission paths will be described hereinafter.

When the third sleeve clutch 410 is shifted leftward in FIG. 2, the gear 401 is interlocked to the output shaft 400. This establishes a transmission path for the high speed state of the auxiliary change speed device. In this state, the drive received by the main shaft 300 after a change speed operation of the main change speed device is transmitted to the output shaft 400 through the gear 302 rotatable with the main shaft 300 and the gear 401 interlocked to the output shaft 400. The transmission paths in the high speed state may be summarized as follows;

(1) First Speed in the High Speed State:

first shaft (gear 101) to intermediate shaft (gear 201 to gear 204), to main shaft (gear 303 to gear 302) and to output shaft (gear 401);

(2) Second Speed in the High Speed State:

first shaft (gear 101) to intermediate shaft (gear 201 to gear 203), to main shaft (gear 302) and to output shaft (gear 401);

(3) Third Speed in the High Speed State:

first shaft (gear 101) to intermediate shaft (gear 201 to gear 202), to main shaft (gear 301 to gear 302) and to output shaft (gear 401); and (4) Fourth Speed in the High Speed State:

first shaft (gear 101), to main shaft (gear 302) and to output shaft (gear 401).

When the third sleeve clutch 410 is shifted rightward in FIG. 2, the gear 402 is interlocked to the output shaft 400. This establishes a transmission path for the creep state of the auxiliary change speed device. In this state, the drive received by the main shaft 300 after a change speed operation of the main change speed device is transmitted to the output shaft 400 through the gear 304 rotatable with the main shaft 300, the gear 404 freely rotatable on the output shaft 400, and the gear 402 mounted on the output shaft 400. The gear 402 on the output shaft 400, the gears 501 and 502 on the creep shaft 500, and the gears 404 and 405 on the output shaft 400 constitute a creep speed gear group. The transmission paths in the creep speed state may be summarized as follows;

(1) First Speed in the Creep State:

first shaft (gear 101) to intermediate shaft (gear 201 to gear 204), to main shaft (gear 303 to gear 304), to output shaft (gear 404 to 405), to creep shaft (gear 502 to gear 501) and to output shaft (gear 402);

(2) Second Speed in the Creep State:

first shaft (gear 101) to intermediate shaft (gear 201 to gear 203), to main shaft (gear 302 to gear 304), to output shaft (gear 404 to 405), to creep shaft (gear 502 to gear 501) and to output shaft (gear 402);

(3) Third Speed in the Creep State:

first shaft (gear 101) to intermediate shaft (gear 201 to gear 204), to main shaft (gear 301 to gear 304), to output shaft (gear 404 to 405), to creep shaft (gear 502 to gear 501) and to output shaft (gear 402); and (4) Fourth Speed in the Creep State:

first shaft (gear 101), to main shaft (gear 304), to output shaft (gear 404 to 405), to creep shaft (gear 502 to gear 501) and to output shaft (gear 402).

When the fourth sleeve clutch 420 is shifted rightward in FIG. 2, the gear 404 is interlocked to the output shaft 400. This establishes a transmission path for the low speed state of the auxiliary change speed device. In this state, the drive received by the main shaft 300 after a change speed operation of the main change speed device is transmitted to the output shaft 400 through the gear 304 rotatable with the main shaft 300 and the gear 404 interlocked to the output shaft 400. The transmission paths in the low speed state may be summarized as follows;

(1) First Speed in the Low Speed State:

first shaft (gear 101) to intermediate shaft (gear 201 to gear 204), to main shaft (gear 303 to gear 304) and to output shaft (gear 404);

(2) Second Speed in the Low Speed State:

first shaft (gear 101) to intermediate shaft (gear 201 to gear 203), to main shaft (gear 302 to gear 304) and to output shaft (gear 404);

(3) Third Speed in the Low Speed State:

first shaft (gear 101) to intermediate shaft (gear 201 to gear 202), to main shaft (gear 301 to gear 304) and to output shaft (gear 404); and (4) Fourth Speed in the Low Speed State:

first shaft (gear 101), to main shaft (gear 304) and to output shaft (gear 404).

When the fourth sleeve clutch 420 is shifted leftward in FIG. 2, the gear 403 is interlocked to the output shaft 400. This establishes a transmission path for the backward drive state of the auxiliary change speed device. In this state, the drive received by the main shaft 300 after a change speed operation of the main change speed device is transmitted to the output shaft 400 through the gear 304 rotatable with the main shaft 300, the reversing gear 205 rotatable relative to the intermediate shaft 200, and the gear 403 interlocked to the output shaft 400. The reversing gear 205 and the gear 403 constantly meshed with the gear 205 constitute the reversing gear group. The transmission paths in the backward drive state may be summarized as follows;

(1) First Speed in the Backward Drive State:

first shaft (gear 101) to intermediate shaft (gear 201 to gear 204), to main shaft (gear 303 to gear 304), intermediate shaft (gear 205) and to output shaft (gear 403);

(2) Second Speed in the Backward Drive State:

first shaft (gear 101) to intermediate shaft (gear 201 to gear 203), to main shaft (gear 302 to gear 304), intermediate shaft (gear 205) and to output shaft (gear 403);

(3) Third Speed in the Backward Drive State:

first shaft (gear 101) to intermediate shaft (gear 201 to gear 202), to main shaft (gear 301 to gear 304), intermediate shaft (gear 205) and to output shaft (gear 403); and (4) Fourth Speed in the Backward Drive State:

first shaft (gear 101), to main shaft (gear 304), intermediate shaft (gear 205) and to output shaft (gear 403).

The present invention provides the above arrangement of the three transmission shafts (i.e. the first shaft 100, main shaft 300 and intermediate shaft 200) of the main change speed device, the two transmission shafts (i.e. the output shaft 400 and creep shaft 500) of the auxiliary change speed device, and the gear groups mounted on these shafts. This arrangement realizes a small transmission structure having not only a reduced axial dimension but a large number of speeds.

What is claimed is:

1. An apparatus for transmitting drive from an engine through a main clutch to front or rear wheels of a working vehicle, comprising:

main change speed means including:

a first shaft connected at one end thereof to said clutch, and having a gear mounted at the other end in an interlocked state;

an intermediate shaft having, mounted thereon, an intermediate shaft gear group formed of a plurality of gears, and a first shift clutch, said first shift clutch being switchable among a first speed position corresponding to a first speed stage of said main change speed means, a second speed position corresponding to a second speed stage of said main change speed means, and a neutral position; and a main shaft disposed coaxially with said first shaft and having, mounted thereon, a main shaft gear group formed of a plurality of gears, and a second shift clutch, said second shift clutch being switchable among a third speed position corresponding to a third speed stage of said main change speed means, a neutral position, and a fourth speed position corresponding to a fourth speed stage of said main change speed means; and auxiliary change speed means including:
- an output shaft having, mounted thereon, an output shaft gear group formed of a plurality of gears, a third shift clutch and a fourth shift clutch, said third shift clutch being switchable among a high speed position corresponding to a high speed state of said auxiliary change speed means, an ultralow speed position corresponding to an ultralow speed state of said auxiliary change speed means, and a neutral position, said fourth shift clutch being switchable among a low speed position corresponding to a low speed state of said auxiliary change speed means, a backward drive position corresponding to a backward drive state of said auxiliary change speed means, and a neutral position; and
- a creep shaft disposed parallel to said output shaft and having, mounted thereon, a creep gear group formed of a plurality of gears, said creep gear group transmitting drive from said main shaft to said output shaft when said third shift clutch is operated to said ultralow speed position.

2. An apparatus as defined in claim 1, wherein said main change speed means, in said first, second and third speed stages, transmits drive from said first shaft to said main shaft through said intermediate shaft gear group and said main shaft gear group, and said second shift clutch, in said fourth speed stage, directly connects said first shaft to said main shaft.

3. An apparatus as defined in claim 1, wherein said auxiliary change speed means, in said high speed state and said low speed state, transmits drive from said main shaft to said output shaft through said main shaft gear group and said output shaft gear group, in said ultralow speed state, transmits drive from said main shaft to said output shaft through a rotatable gear of said output shaft gear group, said creep gear group and said output shaft gear group, and in said backward drive state, transmits drive from said main shaft to said output shaft through one of said gears in said intermediate shaft gear group and one of said gears in said output shaft gear group.

4. An apparatus as defined in claim 2, wherein said intermediate shaft gear group includes two gears interlocked to said intermediate shaft, two gears selectively interlockable to said intermediate shaft by said first shift clutch, and a gear constantly rotatable with said intermediate shaft for use in reversing; said main shaft gear group includes three gears constantly interlocked to said main shaft, and a gear interlockable to said main shaft by a switching operation of said second shift clutch; said output shaft gear group includes two gears selectively interlockable to said output shaft by a switching operation of said third shift clutch, and two gears selectively interlockable to said output shaft by a switching operation of said fourth shift clutch; and said creep gear group includes two gears interlocked to said creep shaft.

* * * * *